United States Patent
Seltz

[19]

[11] Patent Number: 5,823,413
[45] Date of Patent: Oct. 20, 1998

[54] SPARE TIRE COVER

[76] Inventor: Clarence Seltz, 9133 State Rd., Otisville, Mich. 48463

[21] Appl. No.: 880,758

[22] Filed: Jun. 23, 1997

[51] Int. Cl.[6] .................................................. B62D 43/04
[52] U.S. Cl. ...................... 224/402; 224/42.2; 224/42.23
[58] Field of Search .................................. 224/402, 538, 224/42.2, 42.23, 42.25; 296/37.2, 37.3, 37.6; D12/202, 204

[56] References Cited

U.S. PATENT DOCUMENTS

| | | | |
|---|---|---|---|
| D. 305,322 | 1/1990 | Campbell | D12/202 |
| 3,870,360 | 3/1975 | Nichols | 296/37 A |
| 4,516,706 | 5/1985 | Niehaus | 224/42.2 |
| 4,548,540 | 10/1985 | Renfro | 224/42.2 X |
| 4,993,609 | 2/1991 | Flint | 224/42.2 |
| 5,076,477 | 12/1991 | Colgan | 224/42.2 |
| 5,402,922 | 4/1995 | Jordan et al. | 224/42.2 |
| 5,669,534 | 9/1997 | Edgerley | 224/42.23 |

FOREIGN PATENT DOCUMENTS 784718   10/1957   United Kingdom ................ 224/42.23

*Primary Examiner*—Renee S. Luebke
*Attorney, Agent, or Firm*—David L. Volk

[57] ABSTRACT

A container is adapted to contain a spare tire therein. The container includes a substantially planar member and a wall forming a substantially perpendicular angle with the substantially planar member. The container is adapted to be fastened to an underside of a vehicle such that the substantially planar member is substantially adjacent the underside of the vehicle and the wall extends downwardly from the substantially planar member. A seal is adapted to be positioned between the substantially planar member and the underside of the vehicle. An aperture in the substantially planar member is adapted for a spare tire support member to extend downwardly through the substantially planar member from the underside of the vehicle and into the container. A covering member is configured to cover an open end of the container opposite of the substantially planar member. At least two elastic straps are attached to the wall of the container, and the covering member includes at least two strap retainers configured to retain the straps such that the covering member is held to the container.

3 Claims, 2 Drawing Sheets

SPARE TIRE COVER

BACKGROUND OF THE INVENTION

1. Field of the Invention

The present invention relates to covers, particularly to a cover for a spare tire.

2. Description of the Related Art

Pick up trucks often include hardware for storing a spare tire beneath the vehicle. Also included may be a lifting device for lifting the spare tire up to the underside of the vehicle for storing, and to aid in lowering the spare tire from the underside of the vehicle for use.

After continued winter time use on salted roads, the storage hardware and the lifting device can freeze and corrode, becoming inoperable or difficult to operate, making changing a tire a much more frustrating, cumbersome and time consuming procedure.

What is needed is a device that would protect the storage hardware and the lifting device from the effects of freezing and corrosion.

SUMMARY OF THE INVENTION

The spare tire cover of the present invention includes a container adapted to contain a spare tire therein. The container includes a substantially planar member and a wall forming a substantially perpendicular angle with the substantially planar member. The container is adapted to be fastened to an underside of a vehicle such that the substantially planar member is substantially adjacent the underside of the vehicle and the wall extends downwardly from the substantially planar member. A seal is adapted to be positioned between the substantially planar member and the underside of the vehicle. An aperture in the substantially planar member is adapted for a spare tire support member to extend downwardly through the substantially planar member and into the container from the underside of the vehicle. A covering member is configured to cover an open end of the container opposite of the substantially planar member. At least two elastic straps are attached to the wall of the container, and the covering member includes at least two strap retainers configured to retain the straps such that the covering member is held to the container. Thus, the spare tire is held by the spare tire support member within the container, and the container is covered by the covering member.

The spare tire cover of the present invention keeps the spare tire support member, and any other hardware which may be provided adjacent the spare tire support member, such as a spare tire lifting device, protected from moisture and road salt, which can cause freezing and corrosion.

DETAILED DESCRIPTION

Figure 1:
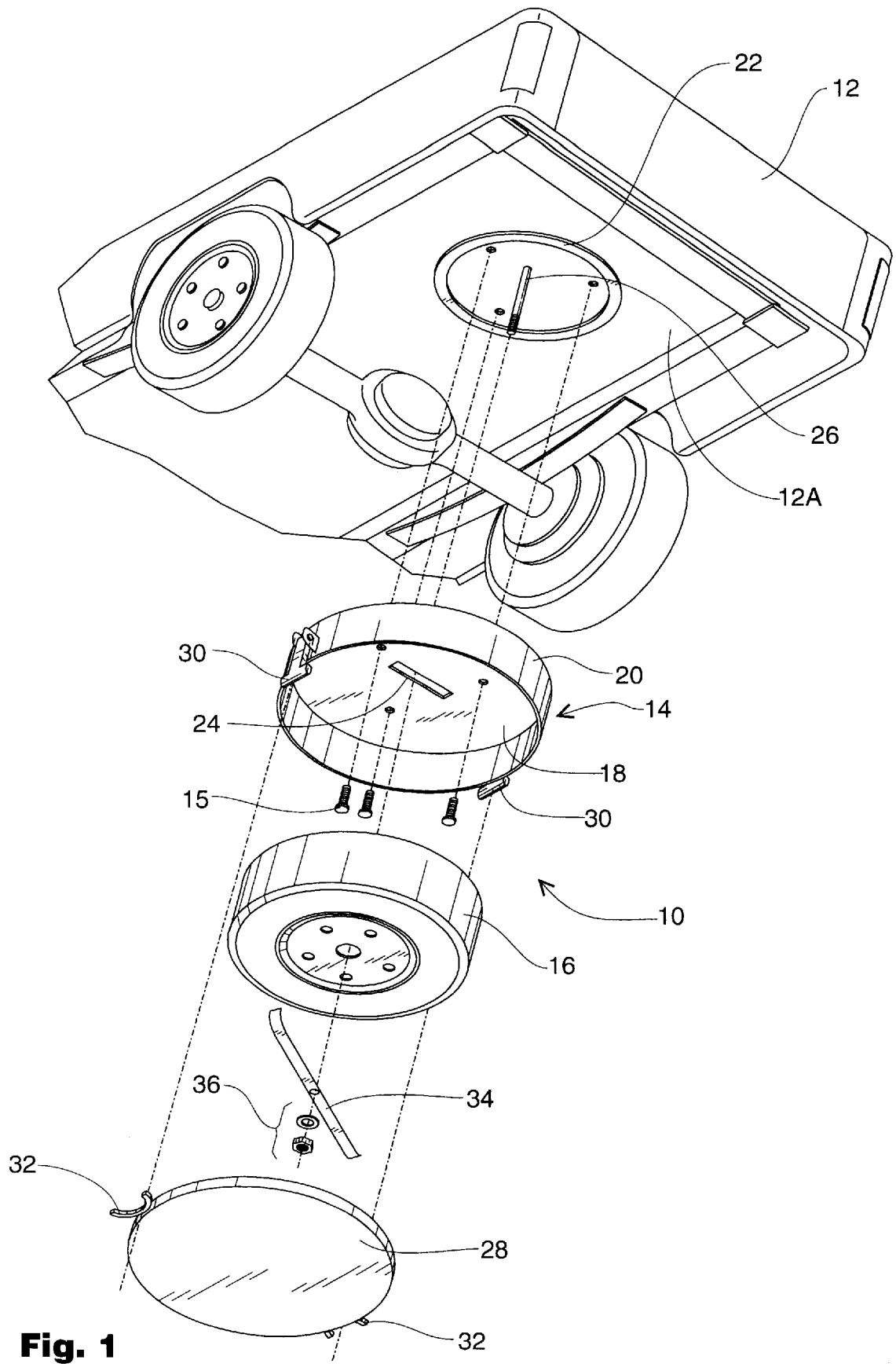
FIG. 1 is an exploded perspective view of the spare tire cover of the present invention, attached to an a pickup truck.

FIG. 1 is an exploded perspective view of a spare tire cover 10 of the present invention, attached to an underside 12A of a pickup truck 12. The spare tire cover 10 includes a container 14 adapted to contain a spare tire 16 therein. The container 14 includes a substantially planar member 18 and a wall 20 forming a substantially perpendicular angle with the substantially planar member 18.

The container 14 is adapted to be bolted to the underside 12A of the pickup truck 12 with bolts 15 such that the substantially planar member 18 is substantially adjacent the underside 12A of the pickup truck 12 and the wall 20 extends downwardly from the substantially planar member 18. A seal 22 is adapted to be positioned between the substantially planar member 18 and the underside 12A of the pickup truck 12.

An aperture 24 in the substantially planar member 18 is adapted for a spare tire support member 26 to extend downwardly through the substantially planar member 18 and into the container 14 from the underside 12A of the pickup truck 12. As is known in the art, the spare tire support member 26 is normally inserted through the spare tire 16, and a brace 34 is connected to the support member 28 using a threaded nut and washer 36, thus holding the spare tire 16 in place.

Located adjacent the spare tire support member 26 may be a conventional tire lifting device (not shown) for lifting the spare tire up and onto the support member 26. The aperture 24 should be configured to permit the lifting device to fit through the aperture 24 together with the support member 26.

Figure 2:
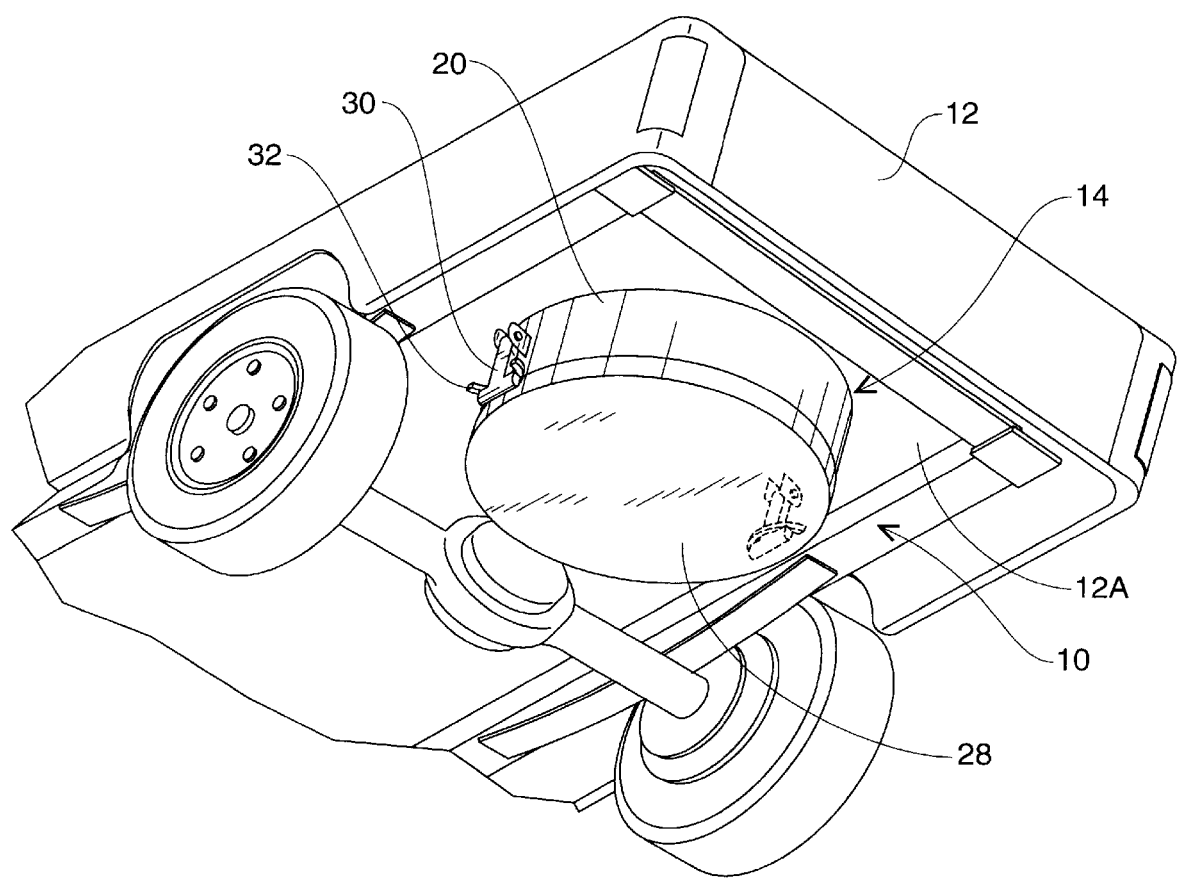
FIG. 2 is a perspective view of the spare tire cover in a closed configuration.

FIG. 2 is a perspective view of the spare tire cover 10 in a closed configuration. Referring to FIGS. 1 and 2, a covering member 28 is configured to cover an open end of the container 14 opposite of the substantially planar member 18. At least two elastic straps 30 are attached to the wall 20 of the container 14, and the covering member 28 includes at least two strap retainers 32 configured to retain the straps 30 such that the covering member 28 is held to the container 14.

To use the invention, one bolts the container to the underside 12A of the vehicle 12, making sure to include the seal 22 between the substantially planar member 18 and the underside 12A of the vehicle 12. The spare tire support member 26 extends through the aperture 24 into the container 14. The spare tire 16 is placed over the spare tire support member 26, and the brace 34 is attached to the spare tire support member 26. Then the covering member 28 is placed in covering relationship to the open end of the container 14, and the straps 30 are fitted within the strap retainers 32 to hold the covering member 28 to the container 14. Thus, the spare tire 16 is held securely within the spare tire cover 10, and the spare tire support member 26, the brace 34, the threaded nut and washer 36, and any lifting device (not shown) are protected from moisture and road salt.

When the spare tire 16 is needed, the user simply releases the straps 30 from the strap retainers 32 and removes the covering member 28 to reveal the spare tire 16. The spare tire 16 is then removed from the spare tire support member 26 in the conventional manner.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A spare tire cover comprising:
    a. a container adapted to contain a spare tire therein, the container including a substantially planar member and a wall forming a substantially perpendicular angle with the substantially planar member;

b. a fastening means adapted for fastening the container to an underside of a vehicle such that the substantially planar member is substantially adjacent the underside of the vehicle and the wall extends downwardly from the substantially planar member;

c. an aperture in the substantially planar member adapted for a spare tire support member to extend downwardly through the substantially planar member from the underside of the vehicle when the container is fastened to the underside of the vehicle;

d. a covering member configured to cover an open end of the container opposite of the substantially planar member;

e. at least two elastic straps attached to the wall of the container; and f. the covering member having at least two strap retaining means configured to retain the straps such that the covering member is held to the container in covering relationship to the open end of the container.

2. The spare tire cover of claim 1, wherein the straps are each generally T-shaped.

3. The spare tire cover of claim 1, further comprising a seal adapted to be positioned between the substantially planar member and the underside of the vehicle when the container is fastened to the underside of the vehicle.

* * * * *